June 10, 1952 C. GEISER 2,599,756
300 DEGREE DIRECTLY DRIVEN RATIOMETER
Filed May 8, 1950 5 Sheets-Sheet 1

INVENTOR
CARL GEISER
BY Robert S. Dunham
ATTORNEY

June 10, 1952 C. GEISER 2,599,756
300 DEGREE DIRECTLY DRIVEN RATIOMETER
Filed May 8, 1950 5 Sheets-Sheet 2

INVENTOR
CARL GEISER
BY Robert S. Dunham
ATTORNEY

June 10, 1952   C. GEISER   2,599,756
300 DEGREE DIRECTLY DRIVEN RATIOMETER
Filed May 8, 1950   5 Sheets-Sheet 3

INVENTOR
CARL GEISER
BY Robert S. Dunham
ATTORNEY

June 10, 1952  C. GEISER  2,599,756
300 DEGREE DIRECTLY DRIVEN RATIOMETER
Filed May 8, 1950 5 Sheets-Sheet 4

INVENTOR
CARL GEISER
BY Robert S. Dunham
ATTORNEY

June 10, 1952  C. GEISER  2,599,756
300 DEGREE DIRECTLY DRIVEN RATIOMETER
Filed May 8, 1950  5 Sheets-Sheet 5

INVENTOR
CARL GEISER
BY Robert S. Dunham
ATTORNEY

Patented June 10, 1952

2,599,756

UNITED STATES PATENT OFFICE 2,599,756

300 DEGREE DIRECTLY DRIVEN RATIOMETER

Carl Geiser, Long Island City, N. Y., assignor to The Liquidometer Corporation, Long Island City, N. Y., a corporation of Delaware Application May 8, 1950, Serial No. 160,617

14 Claims. (Cl. 318—25)

1

This invention relates to electrically controlled movements such as are used to operate indicators, control mechanisms, recording systems, and the like.

The invention is particularly described as embodied in a meter and associated circuits for the measurement and indication of the ratio of two electrical quantities. The term "ratiometer" is used herein to mean an electrical meter which provides an indication which is a function of the ratio of two like electrical quantities such as impedance, resistance, voltage, current, etc. Ratiometers for indicating the ratio of two electrical currents may include two windings positioned at right angles to each other and arranged to control the position of a magnetic armature, which is pivotally mounted and free to align itself in accordance with the relative intensities of the fields produced by the two windings.

In meters of this type, the total movement of the armature is limited to ninety degrees, so that the scale, which cooperates with an indicator hand secured to the armature, extends over a ninety degree arc. However, it is often desirable, in order to be able to read the meter indications with greater accuracy, to have the scale spread over a greater distance. One way of accomplishing this is to increase the length of the indicator hand to permit a corresponding increase in the length of the ninety degree scale. But, expansion of the scale in this manner requires more space for the indicator dial and the mass and inertia of the indicator hand is necessarily greater, so that the sensitivity or speed of response of the meter is decreased.

The scale may also be expanded by connecting the armature to the indicator hand through a delicate gear train arranged so that the ninety degree movement of the armature produces a greater movement of the indicator hand. Such precision gearing arrangements are difficult and expensive to manufacture and also tend to reduce the sensitivity of the meter.

Various other arrangements have been proposed for expanding the scale of such meters, but they have not achieved commercial acceptance because they have for the most part been relatively complicated, expensive to manufacture, and difficult to adjust so as to give a substantially uniform scale calibration.

In accordance with the present invention, a ratiometer is provided which is relatively simple in construction, easily manufactured, reliable in operation, and rugged in construction, and which is subject to many modifications, so that it can be used for many different applications.

2

In a preferred embodiment of the invention, an indicator and its associated circuits are arranged to provide an indication of the position of a contact that moves along a resistance element, that is, to provide an indication which is a function of the ratio of the two portions of the resistor on opposite sides of the sliding contact, and which is independent of the magnitude of the supply voltage. The indicating meter is provided with a number of windings positioned at spaced intervals around a magnetized rotor which is arranged to assume a position along an approximately three hundred degree arc proportional to the setting of the slidable contact.

A liquid level measuring system is an example of the utility of the present invention. A float positioned on the surface of the liquid may be connected by an arm to the sliding contact of a potentiometer, so that the setting of the potentiometer is proportional to the level of the liquid being measured. This potentiometer is connected to the indicating instrument, in a manner to be described more fully hereinafter, the scale of which, extending over three hundred degrees or more, may be calibrated in terms of volume of fuel in the tank.

Thus, one aspect of the invention is directed to a ratiometer having a useful scale extending over an arc greater than ninety degrees. Another aspect of the invention relates to a position indicating meter and its associated circuits for telemetering positional information. Another aspect of the invention relates to apparatus for increasing the scale linearity of the meter. Still another feature of the invention is embodied in the arrangement of coil structures having two or more separate windings energized so as to produce a reversal of magnetic polarity under predetermined conditions of operation.

Other objects, advantages, and aspects of the invention will be in part pointed out in and in part apparent from the following description considered in conjunction with the accompanying drawings in which.

Figure 1:
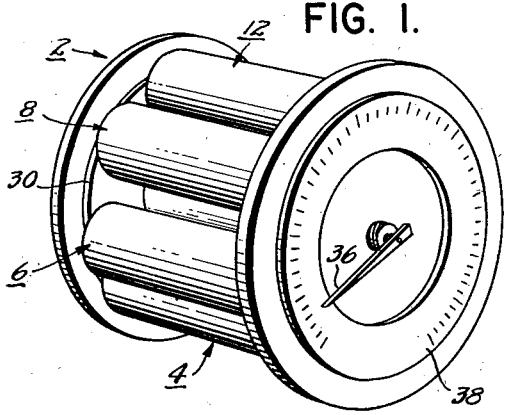
Figure 1 is a perspective view of a meter constructed in accordance with present invention.
Figure 2:
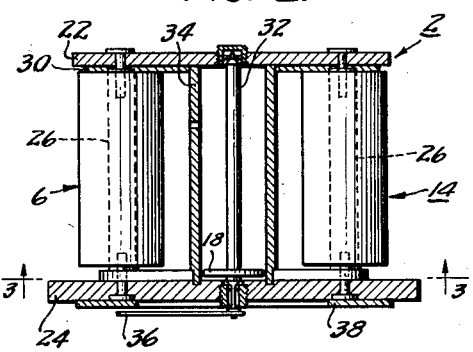
Fig. 2 is a sectional view of the meter shown in Fig. 1 taken along line 2—2 of Fig. 3.
Figure 3:
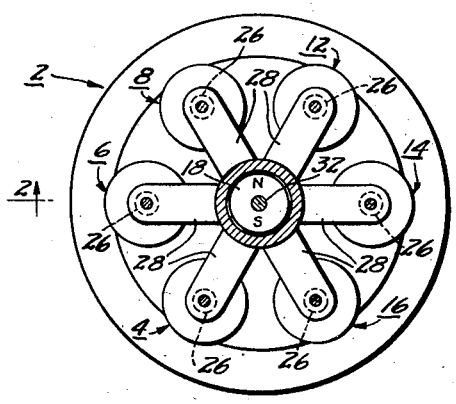
Fig. 3 is a sectional view taken along line 3—3 of Fig. 2.

The meter generally indicated at 2 in Figs. 1, 2 and 3 includes six coil structures, generally indicated at 4, 6, 8, 12, 14 and 16, supported symmetrically around a rotatably mounted magnetized armature 18. The physical construction of this meter may be similar to the instrument disclosed in U. S. Patent No. 2,486,972.

The coil structures 4 to 16 are supported at opposite ends by end plates 22 and 24 of non-magnetic material. Each of the coil structures is provided with a core 26 of soft iron that extends longitudinally through the coil structure and which, at the forward end, is joined to a pole shoe 28, and at the opposite end to a soft iron disc or annulus 30. These pole shoes 28 may be of any suitable shape and in this example comprise strips of soft iron, each extending radially inwardly from one of the cores 26 and having an arcuate inner pole face adjacent to the armature 18, which in this example comprises a permanently magnetized disc having transverse, oppositely disposed magnetic poles as indicated in Fig. 3.

The armature 18 is secured to a shaft 32 that is pivotally supported between the end plates 22 and 24. The shaft 32 may be surrounded by a cylindrical shield 34 of non-magnetic material, for example of copper or brass, also supported by the end plates 22 and 24, or this shield can be omitted if desired.

The shaft 32 is provided at one end with a portion of reduced cross-section which extends through the forward end plate 24 and supports an indicator hand or pointer 36 arranged to indicate the angular position of the armature 18 on a scale 38 secured to the outer face of end plate 24.

When direct current is caused to flow through the windings of the coil structures 4 to 16, a field will be produced in the region of the magnetized armature 18, causing it to assume a position in accordance with the relative intensities of the fields produced by the different core structures. The indicator pointer, in this particular embodiment, is arranged to traverse an arc of about three hundred degrees, suitable calibrating marks being provided on the scale 38, for example, to indicate the amount of liquid in a storage tank. If the polarity of the coil fields acting on the armature can be made to reverse polarity twice, in a predetermined sequence, as the sliding contact 44, see Fig. 5, is moved from one end to the other of the potentiometer 42, the indicator pointer 36 can be made to rotate through an arc as long as 350°.

This change in field polarity can be obtained by reversing the direction of the current through the various coil structures, but it is difficult to provide a practical circuit arrangement that will produce such a current reversal as the potentiometer contact is moved from one setting to another.

However, the magnitude of the current flowing in a given direction through a coil structure can be made to vary as a function of the potentiometer setting with relatively simple circuit arrangements. By providing each of the coil structures with two winding portions designated, respectively, as A and B (see Figure 4), the desired reversal of field polarity can be obtained. Coil structure 4, for example, comprises two separate windings 4A and 4B; coil structure 6 comprises two windings 6A and 6B, etc. These windings of each coil structure are arranged so that the fields which they produce are in opposite directions, so that, although the direction of the current through the individual windings does not change, irrespective of the adjustment of the potentiometer 42, the polarity of the magnetic field produced by any one of the coil structures may be reversed because the polarity of the resulting field depends upon which of its two windings produces the stronger field. For example, if windings 16A and 16B were identical, a larger flow of current through winding 16A than through winding 16B would produce a net magnetic field of a given direction, but this direction could be reversed by sufficiently reducing the current through winding 16A or by sufficiently increasing the current through the winding 16B.

Figure 5:
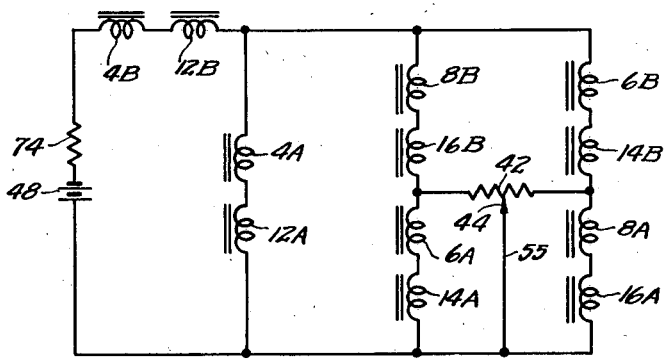
Fig. 5 is a simplified schematic diagram showing one arrangement for controlling the meter indication in accordance with the setting of a potentiometer.

Fig. 5 is a simplified circuit diagram showing one arrangement for connecting various windings of the meter 2 so that the indicator pointer will denote the position of the adjustable contact 44 of the potentiometer 42. The adjustable contact 44, for example, may be mechanically controlled by a float (not shown) on the surface of a liquid, the level of which is to be measured, so that the contact 44 moves along the potentiometer 42 from one end to the other as the level of liquid changes. It is understood, of course, that the potentiometer 42 can be adjusted or controlled by any other desired mechanism and that the present invention is not limited to the measurement of liquid levels, but can be utilized in many types of measurement, control and telemetering systems. Thus from a broad point of view, the indicator is adapted to indicate the magnitude of any condition which can be arranged to control the position of the adjustable contact 44 on the potentiometer 42.

The voltage for operating the system is provided by a battery 48, or other suitable source of unidirectional or direct current. The voltage required will depend upon the size of the meter, its construction, and the characteristics of the windings producing the magnetic field, but, so long as sufficient voltage is provided, the meter readings are independent of the supply voltage. It is one advantage of the present invention that a relatively low voltage can be used to produce sufficient torque on the armature 18 that the indicator pointer 36 will follow smoothly throughout its three hundred degrees of rotation.

The windings illustrated diagrammatically in Fig. 5, have a certain amount of D.-C. resistance, which is not represented in this simplified circuit, but which is understood to be present. These resistances are adjusted so that the travel of the indicator pointer 36 will have the desired linear or non-linear characteristics. Moreover, the number of turns will be different in the different windings, providing a further control of the scale linearity and assuring that sufficient operating torque will be produced at all points on the scale.

The windings 4B and 12B are connected in series with each other, as shown in Fig. 5, and the current through these windings depends upon the setting of potentiometer contact 44 and upon the total resistance of the potentiometer 42 relative to the resistance values of the other windings. In this example, these resistances are proportioned so that the general form of the change in current through the windings 4B and 12B, as the potentiometer contact 44 is moved from one end to the other of the potentiometer 42, is shown by curve 52 in Fig. 6. It is apparent that by doubling the number of turns in the windings 4B and 12B and increasing their resistance by a factor of four, they could be connected in parallel with each other instead of in series as shown in Fig. 5; this is also true of the other windings shown in series relationship.

Figure 6:
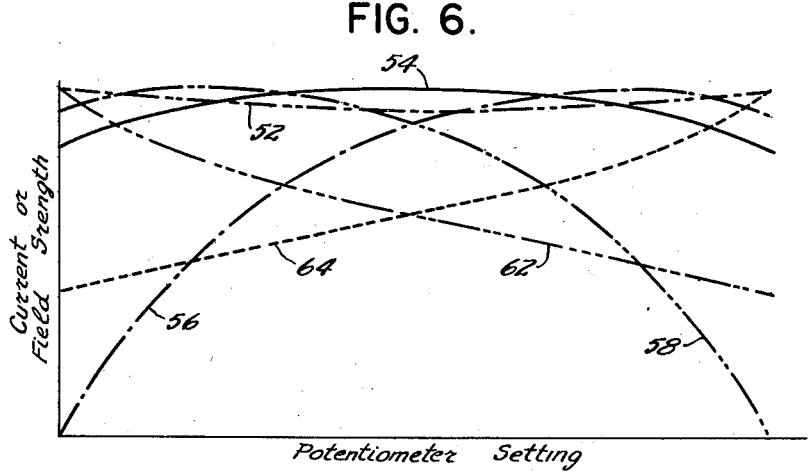
Fig. 6 is a chart showing the character of the change in current through various windings of the meter with changes in the potentiometer setting.

The character of the change in current through coils 4A and 12A is illustrated by curve 54 of Fig. 6, the variation in current being the inverse of that through windings 4B and 12B.

When the contact 44 is at the left hand end of the potentiometer 42, as viewed in Fig. 5, the windings 6A and 14A are shunted by the potentiometer lead 55, so that no current flows through these windings. As the potentiometer contact 44 moves toward the right, the current through these windings increases, reaches a maximum, and then decreases, as shown by curve 56 in Fig. 6. The current through windings 8A and 16A varies in the opposite manner and is illustrated by the curve 58.

The character of the current through windings 8B and 16B is shown by the curve 62, which indicates that the current decreases from a maximum, with the potentiometer contact 44 in the extreme left-hand position, to a minimum when the contact 44 is in the extreme right-hand position. The current through windings 6B and 14B varies in the opposite manner and is illustrated by curve 64.

It is apparent that the current through each of the windings is controlled as a function of the setting of the potentiometer contact 44; these variations are such that the resultant of the orienting forces acting on the armature 18 rotates through three hundred degrees as the potentiometer contact is moved along the potentiometer 42. The curves shown in Fig. 6 are not intended to represent accurately the mathematical values of the currents or the magnetic fields produced by these windings, but rather to show the general character of the change in current or field strength as a function of the potentiometer setting.

Figure 4:
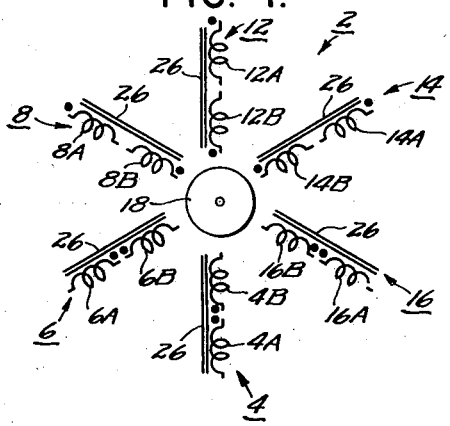
Fig. 4 is a diagrammatic representation of the energizing coils of the meter shown in Figs. 1 to 3.

The magnetic fields produced by the windings 4A, 4B, 12A and 12B are in radial alignment with respect to the armature 18, so that the strength and direction of the field produced by these windings can be determined by algebraically combining the field strengths of the individual windings, it being noted that the fields produced by windings 4B and 12B are in the same direction, as indicated by the dots at the ends of the windings in Fig. 4, while those produced by windings 4A and 12A are in the opposite direction from 4B and 12B. A graph of the change in the net field produced by these four windings can be obtained, therefore, from the curves 52 and 54; this is illustrated by a curve 66 in Fig. 7.

Figure 7:
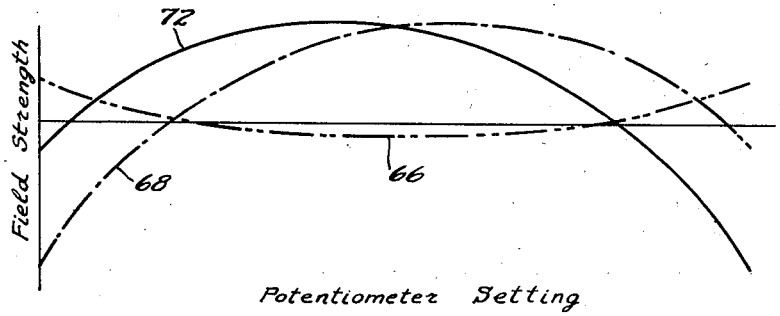
Fig. 7 is a chart showing the character of the change in field strength produced by certain combinations of the meter windings with changes in the potentiometer setting.

The directions of the fields produced adjacent to armature 18 by windings 6A, 6B, 14A and 14B are also in radial alignment, so that curves 56 and 64 can be combined to give the resultant curve 68 of Fig. 7. In a similar manner, the curves 58 and 62, which relate to the windings 8A, 8B, 16A and 16B, can be combined to give a plot of the general shape illustrated by curve 72.

The curve 66 represents the field produced along the direction of a vertical axis, as viewed in Fig. 4, whereas the fields represented by curves 68 and 72 are directed along lines forming sixty degree angles with the vertical and having opposite slopes.

The direction of the resultant magnetic force produced by these windings on the armature 18 can be obtained by calculating the field strengths for different positions of the potentiometer contact 44. This force is such that the armature 18 will rotate through an angle of approximately three hundred degrees as the potentiometer contact 42 is moved from one end to the other of the potentiometer 44, and by proper choice of constants can be made a substantially linear function of the potentiometer setting. Even greater scale length is possible by making some sacrifice in the scale linearity.

The design data for constructing windings and other components to give the desired operating characteristics can be obtained from theoretical calculations, but because the losses and interactions of the unavoidable stray fields are difficult to calculate, it will usually be necessary to make some adjustments by empirical methods. This is not difficult if reference is made to curves of the type shown in Figs. 6 and 7, from which the character of the change that will be produced by changing any particular winding can be readily determined. Such adjustments may be made by altering the number of turns or size of the wire in one or more windings, or by placing suitable resistances in series or parallel with the various windings.

In a typical meter arrangement, such as is shown in Figs. 1 to 5, the linear potentiometer 42 had a total resistance of five hundred ohms, and the system was energized from a twenty-eight volt power source, indicated symbolically by the battery 48, coupled to the meter winding through a series resistance 74 of one hundred eighty ohms. The windings were constructed as indicated by the following table:

| Winding Number | Resistance in Ohms | Wire Size (A.W.G.) | Number of Turns |
|---|---|---|---|
| 4A | 250 | 39 | 2,296 |
| 4B | 50 | 38 | 466 |
| 6A | 250 | 39 | 3,803 |
| 6B | 75 | 38 | 919 |
| 8A | 250 | 39 | 3,803 |
| 8B | 75 | 38 | 919 |
| 12A | 250 | 39 | 2,296 |
| 12B | 50 | 38 | 466 |
| 14A | 250 | 39 | 3,803 |
| 14B | 75 | 38 | 919 |
| 16A | 250 | 39 | 3,803 |
| 16B | 75 | 38 | 919 |

The calibrated scale of a meter constructed in accordance with the above data was linear, with respect to movement of the potentiometer contact, within three percent. Particular non-linear scales can be obtained, if desired, by suitable modifications of the windings or by using a tapered potentiometer.

The armature 18 can be constructed as shown in Figs. 2 and 3, but increased operating torque can be obtained by providing a magnetized disc on each end of the shaft 32 together with an additional set of pole shoes attached to the opposite end of cores 26. This method of construction is disclosed in the aforementioned U. S. Patent No. 2,486,972.

Figure 8:
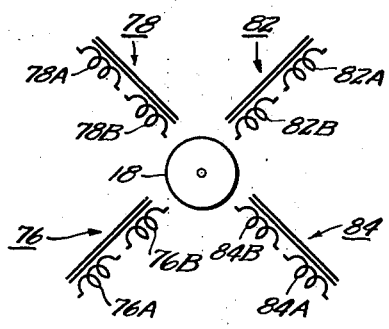
Fig. 8 is a schematic diagram showing the arrangement of the windings in a meter having four coil structures.

Although the use of six coil structures is the now preferred arrangement, a system using four coil structures is somewhat more economical to construct and is satisfactory for many applications. Fig. 8 shows an arrangement of four coil structures, generally indicated at 76, 78, 82 and 84, wherein the coil structures are symmetrically positioned around the armature 18. These coil structures each comprise two windings lettered, respectively, A and B. Thus, coil structure 76 comprises two windings 76A and 76B, coil structure 78 comprises windings 78A and 78B, etc. These coil structures and the other parts of the meter are constructed physically as in the first-described embodiment.

Figure 9:
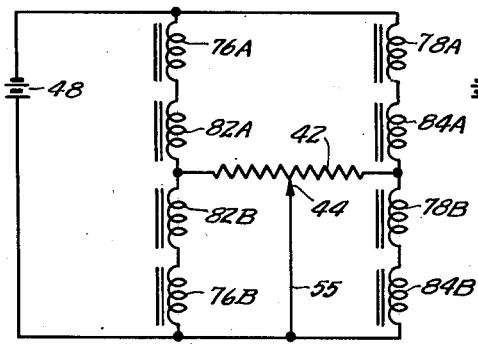
Figs. 9 and 10 show suitable circuit arrangements for operating the meter of Fig. 8.

A suitable circuit arrangement for operating the meter of Fig. 8 is shown in Fig. 9. As in the earlier embodiment, the two windings of each coil structure are connected so that their magnetic fields oppose each other, whereas the windings connected in series, for example, 76A and 82A, are connected so that their magnetic fields are in the same direction.

The general circuit arrangement of the windings is similar to that shown in Fig. 5 except that coil structures corresponding to coil structures 4 and 12, consisting of windings 4A, 4B, 12A and 12B, are omitted.

As in the first example, the characteristics for the coils can be calculated from theoretical considerations, or they can be determined in whole or in part by empirical methods by the use of suitable curves as explained above. Resistors can be incorporated in the circuit, either in series or parallel with the various windings or coil structures, for the purpose of modifying or adjusting the scale characteristics.

Figure 10:
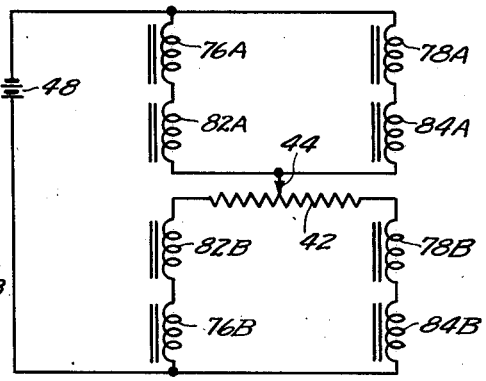

Another circuit arrangement of the meter of Fig. 8 is shown in Fig. 10. This arrrangement is different from that shown in Fig. 9 in that the ends of windings 82A and 84A are connected together and to the potentiometer contact 44. With this arrangement, none of the windings are shunted out of the circuit irrespective of the setting of the potentiometer 42.

Figure 11:
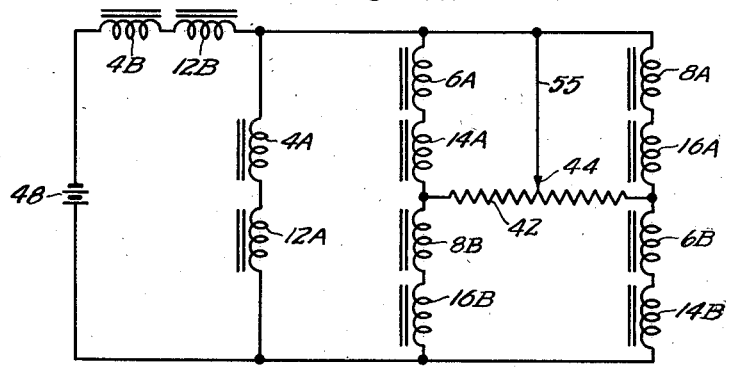
Figs. 11 and 12 show other circuit arrangements that can be used for operating the meter shown in Figs. 1 to 4.

Fig. 11 shows an alternate circuit arrangement for use with the meter shown in Figs. 1 to 4. This circuit is similar to that shown in Fig. 5, except for the potentiometer lead 55, which is now connected to the opposite side of the circuit, and the indicated rearrangement of the windings.

Figure 12:
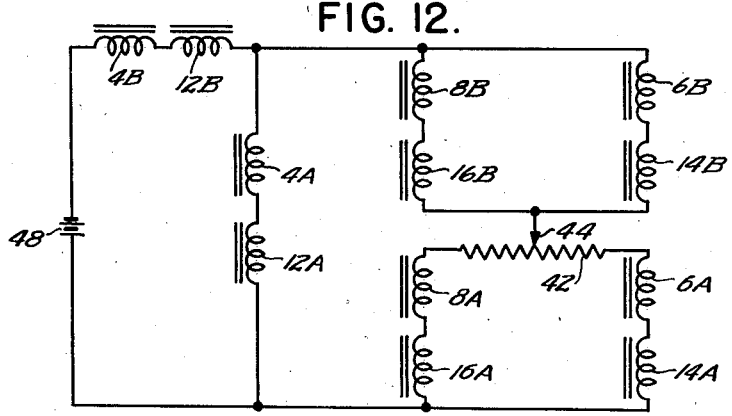

Another circuit for operating the meter of Figs. 1 to 4 is shown in Fig. 12 and is similar to the circuit arrangement for the four-coil meter shown in Fig. 10.

A still more economical long scale meter can be constructed using only two coil structures which is suitable for many purposes, although it obviously does not have many of the advantages of the meters incorporating a larger number of coil structures.

Figure 13:
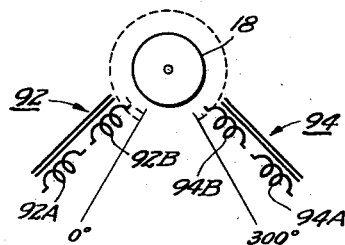
Fig. 13 illustrates diagrammatically a three hundred degree indicator having only two coil structures.

Fig. 13 illustrates schematically a meter having two coil structures, generally indicated at 92 and 94, displaced ninety degreees from each other. Other spacings between the coil structures can be utilized providing suitable adjustments are made in the circuit values and coil structures.

The coil structures 92 and 94 can be constructed and mounted adjacent to the magnetic armature 18 in the same general manner as was described in connection with Figs. 1, 2 and 3. Scale lengths as long as three hundred degrees can be obtained; but with only two coils, it is often more desirable to use a somewhat shorter scale length.

Figure 14:
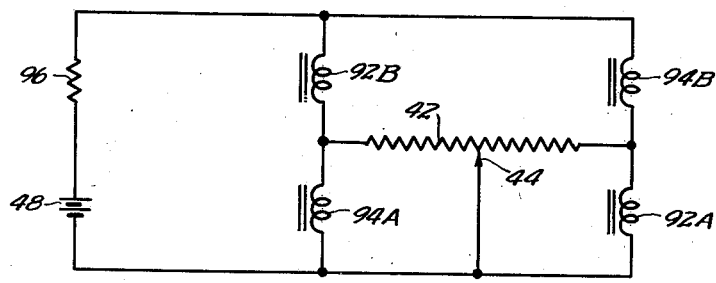
Figs. 14 and 15 show circuit arrangements for operating the meter of Fig. 13.

Each of these coil structures comprises two windings, denoted respectively as A and B, which can be connected, for example, as shown in Fig. 14. This circuit arrangement is generally similar to the circuit arrangement shown in Fig. 9. A resistance element 96 is connected in series with the voltage source 48, but can be omitted, if desired, by making suitable changes in the values of the other circuit elements.

Figure 15:
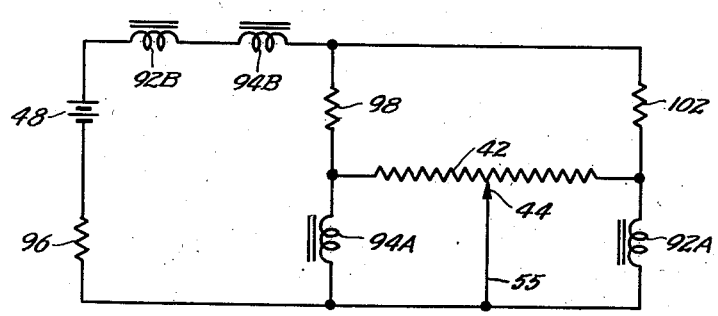

Fig. 15 illustrates another circuit arrangement in which the two windings 92B and 94B are connected in series with the voltage source 48, and two additional fixed-value resistors 98 and 102 are connected between winding 94B and opposite ends of the potentiometer 42.

Figure 16:
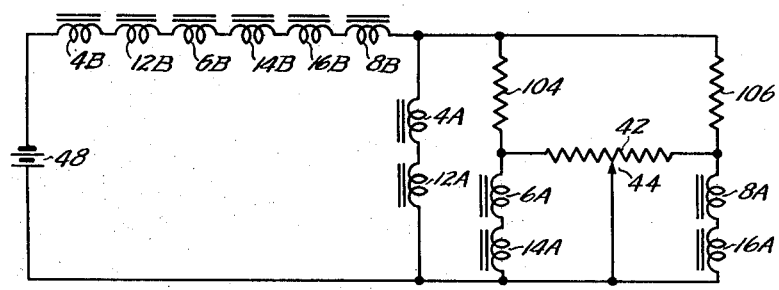
Figs. 16, 17, 18 and 19 illustrate still other circuit arrangements for operating the meter shown in Figs. 1 to 4.

A circuit arrangement somewhat similar to that of Fig. 15 can be used with the six coil structures of Fig. 4 to obtain higher torque. As illustrated in Fig. 16, the six windings 4B, 12B, 8B, 16B, 6B and 14B are connected in series with the voltage source 48, and two resistors 104 and 106 are connected, respectively, between winding 8B and opposite ends of the potentiometer 42. The remaining windings are connected in an arrangement corresponding to that shown in Fig. 5.

Figure 17:
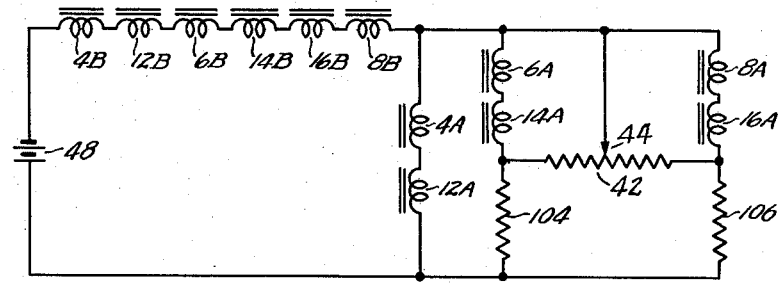

The circuit of Fig. 16 can be modified in various ways without changing the basic operation of the instrument. Fig. 17 shows the resistance 104 interchanged in position with the windings 6A and 14A, and the resistance 106 interchanged in position with windings 8A and 16A, the potentiometer contact 44 being connected to the other side of the circuit.

Figure 18:
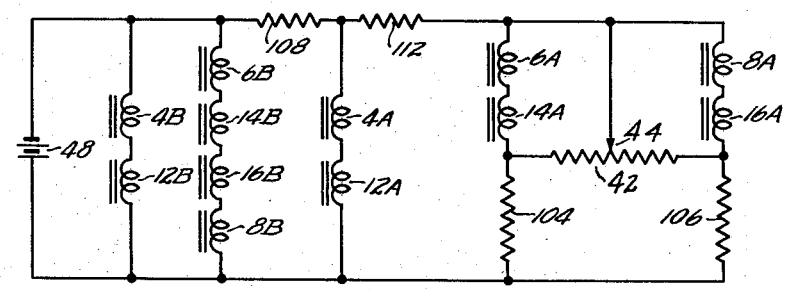

Another example of the modification of the circuit of Fig. 16 is shown in Fig. 18 in which windings 4B and 12B are connected in series with each other and in parallel with the voltage source 48 and also in parallel with the series connection of windings 6B, 14B, 16B and 8B. One terminal of the voltage source 48 is connected through two series connected resistors 108 and 112 to the junction of windings 6A and 8A, which together with windings 14A and 16A are connected in the same relative positions in the circuit as are the corresponding windings in Fig. 17. The windings 4A and 12A are connected in series between the junction of resistors 108 and 112 to the common circuit point connecting resistors 104 and 106, windings 8B and 12B, and one terminal of the voltage source 48. Assuming a constant voltage for the source 48, the current through windings 4B, 12B, 6B, 14B, 16B and 8B will remain constant irrespective of the setting of the potentiometer contact 44. The magnitude of the voltage change produced across windings 4A and 12A as a function of the potentiometer adjustment will depend upon the relative values of resistors 108 and 112 and upon the values of the other circuit components.

Figure 19:
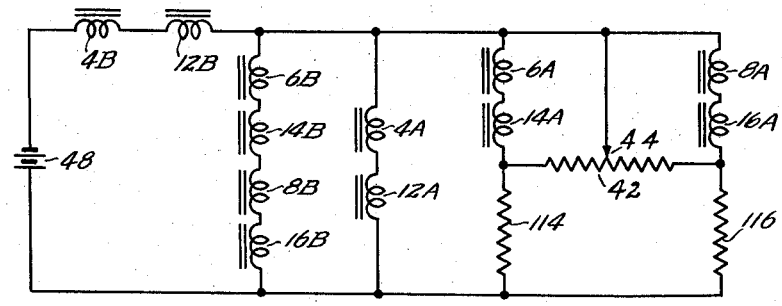

Still another circuit variation is shown in Fig. 19, in which windings 4B, 12B, 6B, 14B, 8B and 16B are connected in series across the voltage source 48, the windings 4A and 12A being connected in series with each other and in parallel with the windings 6B, 14B, 8B and 16B. The remaining windings and two resistors 114 and 116, corresponding to resistors 104 and 106, are connected in the same manner as in Fig. 18. This circuit, of course, is also subject to various modifications as illustrated generally by the earlier examples.

From the foregoing, it will be observed that the electrical instrument embodying my invention is well adapted for the attainment of the ends and objects hereinbefore set forth and to be economically manufactured, the separate features, well suited to common production methods, being subject to a variety of modifications as may be desirable in adapting the invention to different applications. Various operating circuits have been disclosed, but it is obvious that the invention is not necessarily limited to the specific circuit arrangements shown and that numerous changes may be made in the form, construction, and circuit arrangements of the apparatus without departing from the scope of the invention or sacrificing its attendant advantages.

What is claimed is:

1. A position indicator, comprising an armature responsive to electromagnetic fields, a plurality of windings positioned adjacent to said armature for producing electromagnetic fields to control the position of said armature, a potentiometer having fixed terminals and an adjustable contact, the position of which is to be indicated, a source of direct voltage, and a circuit network interconnecting said windings, said potentiometer, and said voltage source including first, second and third circuit branches, said first branch extending from one terminal of said source through a first and a second pair of said windings to the other terminal of said source, said second branch extending from the junction of said first and second pairs of windings through a third and a fourth pair of said windings to said other terminal of said source, said third branch extending between opposite ends of said second branch and including a fifth and a sixth pair of said windings, the fixed terminals of said potentiometer being connected from the junction of said third and fourth pairs of windings to the junction of said fifth and sixth pairs of windings and the adjustable contact thereof being connected to a junction of said second and third branches.

2. A position indicator, comprising an armature responsive to electromagnetic fields, a plurality of windings positioned adjacent to said armature for producing electromagnetic fields to control the position of said armature, a potentiometer having an adjustable contact, the position of which is to be indicated, a source of direct voltage, and a circuit network interconnecting said windings, said potentiometer, and said voltage source and including first, second, and third circuit branches, said first branch extending from one terminal of said source through a first and a second pair of said windings to the other terminal of said source, said second branch extending from the junction of said first and second pairs of windings through a third pair of said windings, a first portion of said potentiometer between the adjustable contact and one end thereof, and a fourth pair of windings to said other terminal of said source, and said third branch extending between opposite ends of said second branch and including a fifth pair of windings, a second portion of said potentiometer between the adjustable contact and the other end thereof, and a sixth pair of windings.

3. A position indicator, comprising an armature responsive to electromagnetic fields, a plurality of windings positioned adjacent to said armature for producing electromagnetic fields to control the position of said armature, a potentiometer having fixed terminals and an adjustable contact, the position of which is to be indicated, a source of direct voltage and a circuit network interconnecting said windings, said potentiometer, and said voltage source and including first and second circuit branches, each connected across said source, said first branch including a first and a second pair of said windings, said second branch including a third and a fourth pair of said windings, the fixed terminals of said potentiometer being connected from the junction of said first and second pair of windings to the junction of said third and fourth pair of windings and the adjustable contact thereof being connected to a junction of said first and second branches.

4. A position indicator, comprising an armature responsive to electromagnetic fields, a plurality of windings positioned adjacent to said armature for producing electromagnetic fields to control the position of said armature, a potentiometer having an adjustable contact, the position of which is to be indicated, a source of direct voltage, and a circuit network interconnecting said windings, said potentiometer, and said voltage source and including first and second circuit branches, said first branch extending from one terminal of said source through a first pair of said windings, a first portion of said potentiometer between its adjustable contact and one end thereof, and a second pair of said windings to the other terminal of said source, and said second branch extending between opposite ends of said first branch and including a third pair of said windings, a second portion of said potentiometer between its adjustable contact and the other end thereof, and a fourth pair of said windings.

5. A ratiometer type indicating instrument, comprising a rotor mounted for rotation about a predetermined axis, magnetic means carried by said rotor and having a polarity transverse of said axis, and at least two stationary deflecting coil structures arranged around said rotor, so as respectively to apply directional magnetic force to said rotor in radial directions in respect to said axis, which are predetermined respectively for each of said coil structures, said directions as to at least two of said coil structures being at a substantial angle to one another, which angle is less than 180°, at least two windings for each of said coil structures, and a circuit means adapted to be energized by a source of unidirectional electric energy and to be controlled by a voltage dividing means adjusted in response to the magnitude of a condition to be indicated by said instrument for controlling the position of said rotor throughout an amplitude of movement thereof of at least about 300°, said circuit means including connections to said source and all said windings, said circuit means further including electrical connections for the windings of each said coil structure such that the magnetic force of one winding of each said coil structure is opposite in polarity from that of a second winding of each said coil structure respectively, said circuit means being controlled by said voltage dividing means to effect a reversal of the direction of magnetic force from each said coil structure at least once over the range of adjustment of said voltage dividing means, and the resultant direction of the magnetic force effective upon said rotor by all said coil structures being a predetermined function of the adjustment of said voltage dividing means and hence of the magnitude of the condition to be indicated.

6. An instrument in accordance with claim 5, in which the angle between said directions is from about 90° to about 120°.

7. An instrument in accordance with claim 5, in which there are at least four of said stationary deflecting coil structures, which are arranged in pairs, the members of each of said pairs being arranged diametrically opposite each other in respect to the axis of said rotor, and in which the common diameters of said pairs respectively through the axis of said rotor are arranged substantially equiangular about said axis.

8. An instrument in accordance with claim 5, in which there are at least four of said stationary deflecting coil structures, which are arranged in pairs, the members of each of said pairs being arranged diametrically opposite each other in respect to the axis of said rotor; and in which one of said windings of each of the members of each of said pairs is series-connected with each other in said circuit means in which said windings are included, and both said series-connected windings of each of said pairs are arranged to exert a magnetic force upon said rotor in a single direction for each pair of said series-connected windings respectively.

9. An instrument in accordance with claim 5, in which there are at least four of said stationary deflecting coil structures, which are arranged in pairs, the members of each of said pairs being arranged diametrically opposite each other in respect to the axis of said rotor; in which one of said windings of each of the members of each of the said pairs is series-connected with each other in said circuit means in which said windings are included, and both said series-connected windings of each of said pairs are arranged to exert a magnetic force upon said rotor in a single direction for each pair of said series-connected windings respectively; and in which the second windings respectively of each of the members of each of said pairs is series-connected with each other in said circuit means in which said windings are included, each series-connected pair of windings of each pair of said coil structures being wound and connected to exert a magnetic force upon said rotor in a single direction for each pair of series-connected windings respectively, and this direction for one pair of series-connected windings of each pair of said coil structures being opposite such direction for the other pair of series-connected windings thereof respectively.

10. An instrument in accordance with claim 5, in which there are six of said stationary deflecting coil structures, which are arranged in three pairs, the members of each of said pairs being arranged diametrically opposite each other in respect to the axis of said rotor, and wherein the common diameters of said pairs respectively through the axis of said rotor are substantially equiangularly spaced from each other.

11. An instrument according to claim 5, in which there are six of said stationary deflecting coil structures, which are arranged in three pairs, the members of each of said pairs being arranged diametrically opposite each other in respect to the axis of said rotor, and wherein the common diameters of said pairs respectively through the axis of said rotor are substantially equiangularly spaced from each other; and in which one of said windings of each of the members of each of said pairs is series-connected with each other in said circuit means in which said windings are included, and both said series-connected windings of each of said pairs are arranged to exert a magnetic force upon said rotor in a single direction for each pair of said series-connected windings respectively.

12. An indicating instrument, comprising a rotor mounted for rotation about a predetermined axis, magnetic means carried by said rotor and having a polarity transverse of said axis, six stationary deflecting coil structures arranged substantially equiangularly around said rotor, so as to apply directional magnetic force to said rotor in radial directions in respect to said axis which are predetermined respectively for each of said coil structures, two windings for each of said coil structures, said coil structures being arranged in three pairs, the members of each of which are substantially diametrically opposite one another in respect to said axis, one of said windings of each member of each pair of said coil structures being series-connected together and wound to provide a magnetic force on said rotor in a single direction and the other winding of each member of each pair of said coil structures being series-connected together and wound to provide a magnetic force on said rotor in a direction opposite said single direction for each pair of said coil structures respectively, and a circuit means adapted to be energized by a source of unidirectional electric energy and to be controlled by a voltage dividing means responsive to the magnitude of a condition to be indicated by said instrument; said circuit means including connections to said source, to each of said windings of said coil structures and to said voltage dividing means to effect a reversal of the direction of the resultant magnetic force from each of said coil structures at least once over the range of adjustment of said voltage dividing means, and the resultant direction of the magnetic force effective upon said rotor by all said coil structures being a predetermined function of the adjustment of said voltage dividing means and hence of the magnitude of the condition to be indicated.

13. An instrument according to claim 12, in which said circuit means includes first, second, third, fourth and fifth circuit branches, said first branch extending between the terminals of said source of unidirectional electric energy through a first series-connected pair of said windings; said second branch extending between said terminals of said source and including a second and a third series-connected pair of said windings; said third branch extending between said terminals of said source and including a first fixed resistance and a fourth series-connected pair of said windings; said fourth branch being connected in parallel with said fourth pair of said windings and including in series, a second fixed resistance, a fifth series-connected pair of said windings and a third fixed resistance; and said fifth branch extending from the junction of said second fixed resistance with said fifth pair of said windings to the end of said fourth pair of said windings which is connected to said one terminal of said source, said fifth branch including a sixth series-connected pair of said windings and a fourth fixed resistance; and in which voltage dividing means is a potentiometer having fixed terminals and an adjustable contact, said fixed terminals of said potentiometer being connected from the junction between said fifth pair of said windings with said third fixed resistance to the junction between said sixth pair of said windings with said fourth fixed resistance, and said adjustable contact being connected to the junction between said fifth and sixth windings.

14. An instrument according to claim 5, in which there are four of said coil structures; in which said circuit means includes first and second circuit branches, both connected in parallel across the terminals of said source of unidirectional electric energy, said first circuit branch including a first and a second series-connected pair of said windings of said coil structures, and said second circuit branch including a third and a fourth series-connected pair of said windings; and in which said voltage dividing means is connected to control the relative currents flowing through at least one series-connected pair of the windings of each of said first and said second branches.

CARL GEISER.

REFERENCES CITED

The following references are of record in the file of this patent:

UNITED STATES PATENTS

| Number | Name | Date |
|---|---|---|
| 1,128,008 | Kramer et al. | Feb. 9, 1915 |
| 1,713,850 | McCoy | May 21, 1929 |
| 2,225,032 | Carbonara | Dec. 17, 1940 |
| 2,393,197 | Scott | Jan. 15, 1946 |
| 2,473,572 | Cooper et al. | June 21, 1949 |
| 2,486,972 | Osterlund et al. | Nov. 1, 1949 |
| 2,530,992 | Rodanet | Nov. 21, 1950 |